Figure 2:
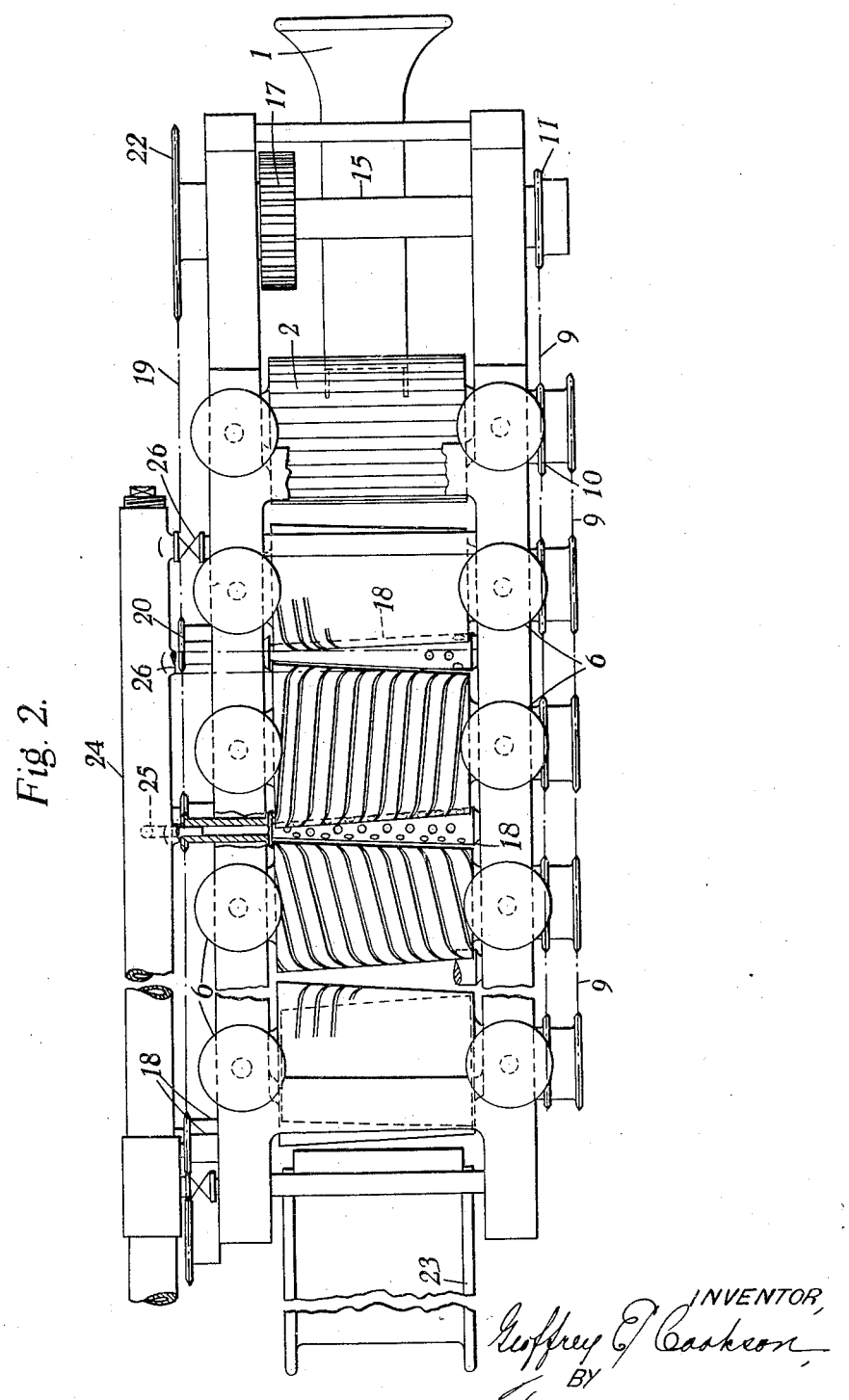

April 26, 1932.  G. E. COOKSON  1,855,941
DECORTICATING FIBROUS MATERIALS
Filed Oct. 27, 1930    2 Sheets-Sheet 1
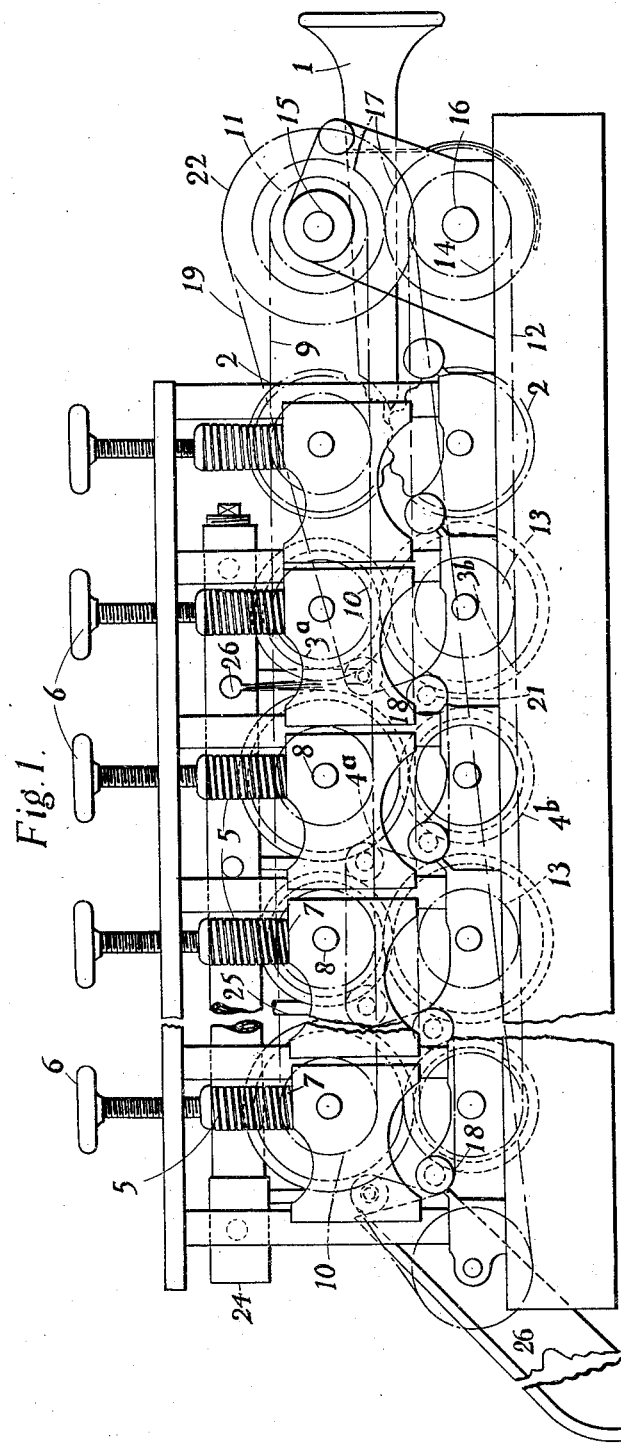
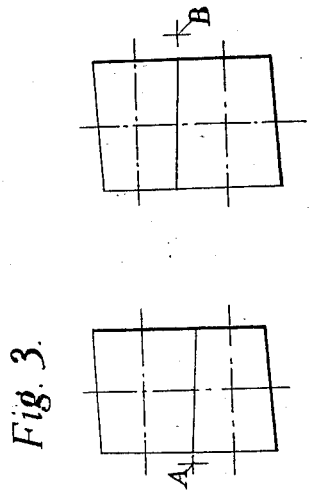
INVENTOR
Geoffrey E. Cookson,
BY
ATTORNEY April 26, 1932. G. E. COOKSON 1,855,941
DECORTICATING FIBROUS MATERIALS
Filed Oct. 27, 1930 2 Sheets-Sheet 2

INVENTOR,
Geoffrey E. Cookson
BY
ATTORNEY

Patented Apr. 26, 1932

1,855,941

UNITED STATES PATENT OFFICE

GEOFFREY EDMUND COOKSON, OF MARLOW, ENGLAND

DECORTICATING FIBROUS MATERIALS

Application filed October 27, 1930, Serial No. 491,609, and in Great Britain November 6, 1929.

This invention relates to machines for decorticating fibrous materials such as sisal, New Zealand hemp and similar leaves and stalks.

According to the present invention in a decorticating machine a series of conical rollers are arranged in pairs to act as crushing rollers. Preferably the two cones of each pair are arranged in such a way that the large end of one cone is in contact with the small end of the other. With such a construction the material under treatment will be subjected to a rubbing action as well as to a crushing action since the rollers will be of different diameters at the various points of contact with the material. The same effect may be obtained by placing the large ends of the rollers of each pair in contact with one another provided that the rollers of each pair are of different size, that is by making them of different mean diameter.

In order to enhance the rubbing effect it is preferred to make the machine such that there is as far as possible a tendency for the fibre to follow a zig-zag course through the machine. For this purpose the true centres of succeeding pairs of rollers, i. e. the points at which the diameters of the two cones are the same are brought out of line with one another and with the common centres, i. e. the points equidistant from the ends of the cones. This may be effected most conveniently by making the rollers of each pair of different mean diameter and then arranging them in one of two ways; in the first way the small roller is on top in one pair while the large roller is on top in the next and so on alternately and all the top rollers taper in the same direction; in the second way all the rollers of one size are on top, but they taper alternately first in one direction and then in the other. However any other convenient arrangement of pairs of conical rollers may be employed.

The surfaces of the rollers may be plain or faced in any convenient manner. It is preferred, however, to form spiral grooves on the surfaces since this is found materially to add to the rubbing and spreading action of the rollers on the material.

Yet another feature of the invention consists in providing feed rollers between the pairs of crushing rollers, these feed rollers being arranged to revolve in the same direction as the main rollers with which they are associated. The feed rollers may be cylindrical but preferably they are conical and are arranged so that they taper in the opposite direction to the main rollers from which they take the material. The feed rollers may conveniently be made hollow and be perforated and means may be provided for supplying water to the insides of the rollers so that it will spray out through the perforations.

The rollers which are preferably held in engagement with one another by spring pressure may be made of any suitable material such as wood, iron, steel or brass and may be driven in any convenient manner by chains and sprockets, gearing or other mechanism.

Any numbers of pairs of conical rollers may be employed in accordance with the requirements of the material under treatment and the rollers may be run at the same or different speeds, so as to produce any desired amount of scraping in the longitudinal direction of the fibres. Further, by varying the taper of the rollers, the amount of lateral rubbing to which the fibres are subjected may be varied. If necessary one or more sets of preliminary parallel crushing rollers may be employed and may be plain or fluted, and again pairs of parallel rollers may be interspersed at intervals through the machine if desired.

In order that the invention may be clearly understood and readily carried into effect, one machine constructed in accordance therewith will now be described by way of example with reference to the accompanying drawings in which Figure 1 is a side elevation, and
Figure 2 is a plan of the machine, while
Figure 3 is a diagram to illustrate the arrangement of the rollers.

Referring to the drawings, material such as sisal is fed through a horizontal hopper 1 between two parallel fluted breaking rollers 2. From these the material passes in succession between pairs of conical crushing rollers of which four pairs only are shown in the drawings, although the machine illustrated actually contains a greater number of pairs. Of the first pair of conical rollers, the upper roller 3a is smaller than the lower roller 3b, while in the next pair the upper roller 4a is larger than the lower roller 4b and so on although the rollers of any pair are of the same taper. The upper rollers are pressed downwards by springs 5 controlled by handwheels 6, the springs bearing on brackets 7 in which the shafts 8 of the upper rollers are mounted.

The surfaces of the conical rollers are grooved spirally as shown in Figure 2 and the pairs of rollers are arranged so that the large ends of the large rollers are arranged alternately first on one side of the machine and then on the other. As a result the true centres of succeeding pairs of rollers lie alternately on one side or the other of the common centre and in fact, with rollers of the dimensions illustrated, lie outside the rollers, because the diameter at the small end of the larger roller of each pair is greater than the diameter at the large end of the smaller roller of the pair. This is diagrammatically shown in Figure 3, where the true centres of two succeeding pairs of rollers are shown at A and B. The upper conical rollers are all driven by chains 9 passing around sprockets 10 on the shafts 8 and around a driving sprocket 11, while the lower conical rollers are all driven by chains 12 passing around sprockets 13 and a driving sprocket 14. The driving sprockets 11 and 14 are mounted on two shafts 15 and 16 which are interconnected by gearing 17 and one of which is driven by any suitable source of power.

A number of conical feed rollers 18 are provided all driven by a chain 19 passing around sprockets 20 on the feed roller shafts 21 and around a driving sprocket 22 mounted on the shaft 15. These feed rollers serve to detach the fibrous material from the conical rollers with which they are associated and to guide it towards the next pair of conical rollers. Two feed rollers 18 are arranged between each pair of conical rollers and are arranged so that the upper feed rollers are rotated in the same direction as the upper conical crushing rollers and the lower feed rollers in the same direction as the lower crushing rollers. The feed rollers 18 are not in contact with the conical crushing rollers, but are placed close enough to them to enable the feed rollers to detach from the crushing rollers any material which may tend to adhere to them and to deliver it straight and untangled to the succeeding crushing rollers. These pick the material off the feed rollers so that the fibre is fed uniformly through the machine and is ultimately delivered straight and untangled from the last pair of crushing rollers by means of feed rollers down a chute 23.

The feed rollers 18 are hollow and perforated and water under pressure is supplied to their interiors by means of a main supply pipe 24 and branch pipes 25. Further branch pipes 26 lead from the water supply pipe 24 and are perforated so that water sprays from them onto the fibrous material as the latter passes through the machine.

The action of the machine in freeing the fibre from undesired matter is three fold:—

First the fibre is crushed by the pressure exerted by the springs which hold the rollers in contact, the material being flattened and the liquid squeezed out. Secondly lateral friction is exerted between the fibres and the surfaces of the rollers, since the material tends to move towards the true centre of each pair of rollers and thus is pulled laterally first in one direction and then in the other as it passes through the machine. This results in the scraping off of matter adhering to the fibre. Thirdly the rollers scrape the material longitudinally on both surfaces, since the peripheral speeds of the rollers of each pair are different.

Many modifications may be made besides those already suggested. Instead of feed rollers rotary brushes or combs may be employed, these acting not only to feed the material through the machine, but also tending to divide the fibres more thoroughly and helping to clear them of megass which has been loosened by the crushing rollers.

In order to reduce the total length of the machine, sets of rollers in pairs may be arranged upon one another, so that the material may travel forward through one series of pairs of rollers in one direction and then back again through the series or pairs of rollers arranged above or below the first series. Again the shafts of the rollers may be extended so that each carries more than one roller. This results in several parallel series of rollers in pairs, each series of which may be separately fed with fibrous material.

I claim:—

1. In a machine for decorticating fibrous material, in combination, a pair of conical rollers mounted to rotate with the small end of each roller in contact with the large end of the other roller, means for rotating said rollers in opposite directions and means for pressing them together.

2. In a machine for decorticating fibrous material, in combination, a plurality of successive pairs of crushing rollers of which at least one roller in each pair is conical, each pair of rollers having along the line of contact not more than one point at which the peripheral speeds of the points of contact are the same, and means for rotating the rollers of each pair in opposite directions and the corresponding rollers of all the pairs in the same direction.

3. In a machine for decorticating fibrous material, in combination, a succession of pairs of conical crushing rollers having their axes horizontal and one roller of each pair disposed vertically above the other roller of the pair, the rollers of each pair having the large end of each in contact with the small end of the other, and means for rotating the rollers of each pair in opposite directions.

4. The invention of claim 3 wherein the true centres of successive pairs of rollers are out of line with one another.

5. The invention of claim 3 wherein the true centres of successive pairs of rollers are staggered in relation to one another.

6. The invention of claim 3 wherein all the upper rollers taper in one direction and all the lower rollers taper in the opposite direction.

7. In a machine for decorticating fibrous material, in combination, a pair of taper crushing rollers mounted to rotate in contact with one another with the small end of one roller opposite the large end of the other roller, and means for rotating said rollers in opposite directions.

8. The invention of claim 2 in combination with feed rollers each mounted to rotate with its surface in proximity to that of a separate one of the crushing rollers and means for rotating each feed roller in the same direction as the crushing roller with which it is associated.

9. The invention of claim 3 in combination with feed rollers each mounted to rotate with its surface in proximity to that of a separate one of the crushing rollers and means for rotating each feed roller in the same direction as the crushing roller with which it is associated.

10. The invention of claim 2 in combination with taper feed rollers each mounted to rotate with its surface in proximity to that of a separate one of the crushing rollers and with its taper oppositely disposed to the taper of that crushing roller, and means for rotating each feed roller in the same direction as the crushing roller with which it is associated.

11. The invention of claim 3 in combination with taper feed rollers each mounted to rotate with its surface in proximity to that of a separate one of the crushing rollers and with its taper oppositely disposed to the taper of that crushing roller, and means for rotating each feed roller in the same direction as the crushing roller with which it is associated.

12. The invention of claim 3 in combination with hollow perforated feed rollers each mounted to rotate with its surface in proximity to that of a separate one of the crushing rollers, means for rotating each feed roller in the same direction as the crushing roller with which it is associated and means for supplying water to the interiors of said feed rollers.

13. The invention of claim 3 wherein the diameter at the small end of one roller of each pair is greater than the diameter at the large end of the other roller of said pair, whereby the true centre of the pair is brought outside the rollers.

14. The invention of claim 3 wherein the diameter at the small end of one roller of each pair is greater than the diameter at the large end of the other roller of said pair, whereby the true centre of the pair is brought outside the rollers, and in successive pairs the large and small rollers alternately constitute the upper roller while all the upper rollers taper in one direction and all the lower rollers taper in the opposite direction.

15. The invention of claim 3 wherein the rollers of each pair differ in mean diameter and in successive pairs the large and small rollers alternately constitute the upper roller while all the upper rollers taper in one direction and all the lower rollers taper in the opposite direction.

16. The invention of claim 2 and means for detaching by scraping action material tending to adhere to said rollers after passing between the rollers of the pairs.

In witness whereof I hereunto subscribe my name this 16th day of October A. D. 1930.

GEOFFREY EDMUND COOKSON.